Dec. 27, 1955           J. HALLER           2,728,619
HEAVY DUTY POROUS CHAMBERED BEARING
Filed March 15, 1952
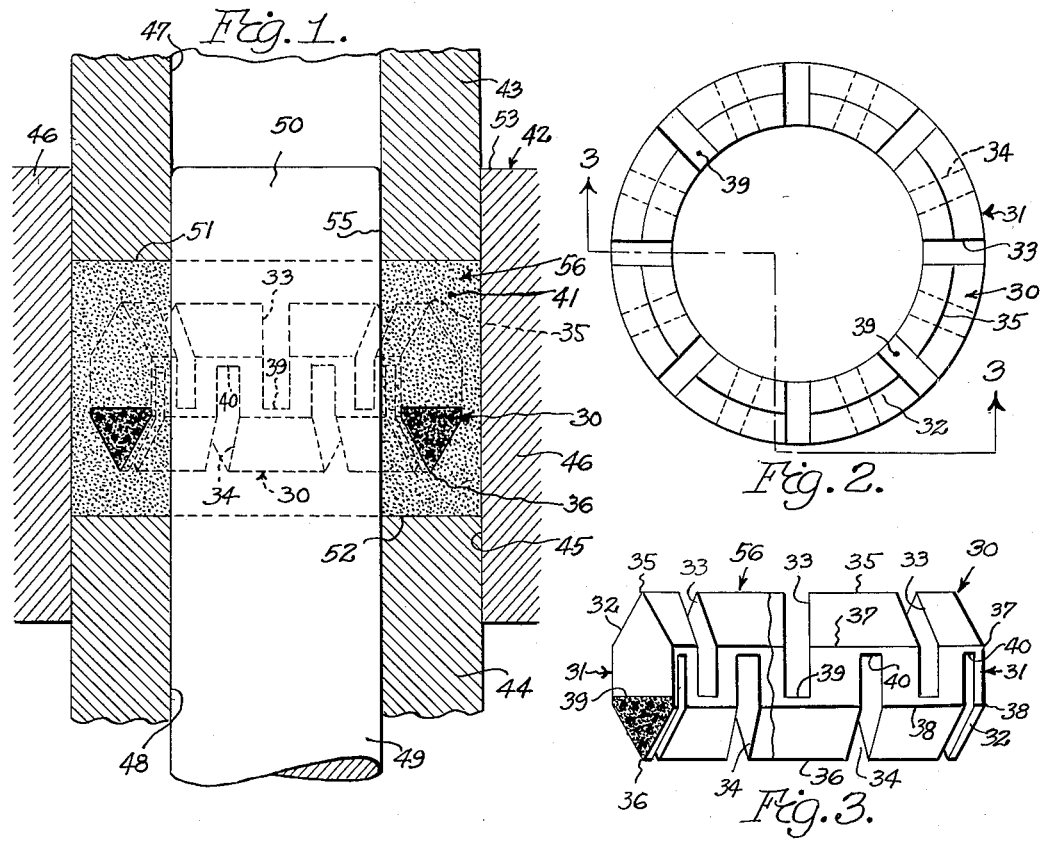

United States Patent Office 2,728,619
Patented Dec. 27, 1955

2,728,619

HEAVY DUTY POROUS CHAMBERED BEARING

John Haller, Northville, Mich., assignor, by mesne assignments, to Allied Products Corporation, Detroit, Mich., a corporation of Michigan Application March 15, 1952, Serial No. 276,814

7 Claims. (Cl. 308—240)

This invention relates to powdered metal bearings and, in particular, to powdered metal porous chambered bearings containing oil chambers within the walls thereof.

One object of this invention is to provide a heavy duty powdered metal oil well bearing which has a large oil capacity, yet which is reinforced at frequent intervals so as to be capable of withstanding heavy radial strains and sustaining heavy radial loads.

Another object is to provide a heavy duty powdered metal porous chambered bearing wherein the oil chamber is reinforced by partitions extending alternately inward from opposite sides of the oil chamber, but terminating short of the opposite wall thereof so as to greatly strengthen the oil chamber while permitting continuous circulation of the oil around the bearing oil chamber.

Another object is to provide a process of making a heavy duty porous chambered bearing which employs an oil chamber core of improved form enabling a higher and more uniform density to be obtained in molding the bearing body containing the oil chamber core.

Another object is to provide an infiltration core of improved shape for forming the oil chamber in a powdered metal bearing, this improved shape of core enabling the density of the powdered metal in the bearing body surrounding the oil chamber to be made higher and more uniform than has hitherto been possible by other forms of oil chamber cores.

Other objects and advantages of the invention will become apparent during the course of the following description of the accompanying drawings, wherein:

Figure 1 is a central vertical section through the die cavity of a powdered metal molding press, showing the molding of a powdered metal porous chambered bearing containing the improved infiltration core of the present invention;

Figure 2 is a top plan view of the improved powdered metal bearing porous chambered core employed in making the oil chamber bearing shown in Figure 1;

Figure 3 is a front elevation, partly in vertical section, of the porous chambered bearing core shown in Figure 2, taken along the line 3—3 in Figure 2;

Figure 4 is a top plan view, partly broken away, in horizontal section of the finished sintered bearing shown being molded in Figure 1;

Figure 5 is a central vertical section taken along the line 5—5 in Figure 4; and Figure 6 is an enlarged fragmentary vertical section taken along the arcuate line 6—6 in Figure 4.

Sintered powdered metal bearings, while enjoying widespread use in industry, have been frequently considered too fragile for heavy duty use, particularly where they are subjected to heavy radial strains or loads and where they are located in such positions as to be not easily accessible for periodic lubrication. The present invention provides a sintered powdered metal bearing which is provided with its own internal oil chamber surrounding the bearing bore, this oil chamber having reinforced walls arranged in such a manner as to enable the bearing to sustain heavy radial loads or strains and at the same time furnish continual lubrication of the bearing bore for the entire life of the bearing, without the need for external lubrication. The invention also provides an improved process of making a heavy duty porous chambered bearing wherein a more uniform density is obtained in the vicinity of the oil chamber, as well as an improved infiltration core for producing this improved porous chambered bearing.

Referring to the drawings in detail, Figures 4 to 6 inclusive show a heavy duty porous chambered bearing, generally designated 10, according to one form of the invention, as consisting of a sleeve 11 of sintered powdered metal, such as iron or bronze, having a bearing bore 12 and an external surface 13 of substantially cylindrical form. Disposed within the sleeve 11 is an oil chamber 14 of approximately annular shape extending around the bearing bore 12 and containing a cellular oil-holding structure 15 in the form of a honeycomb of metallic particles 16 separated from one another by minute empty spaces 17 and resembling a spongy formation. The metallic particles 16 are preferably of the same metal as the particles 18 of which the bearing body or sleeve 11 is made up (Figure 6) but of much coarser sizes. It will be understood that, alternatively, the oil chamber 14 may consist of an empty space or hollow void, the honeycomb structure 15 being preferred, however, because of its greater strength and also because of its lesser tendency to trouble arising from air bubbles in the oil.

The oil chamber 14 is only approximately annular in shape, since it is of a special form arranged to give the maximum strength against failure from excessive radial loads while still providing adequate lubricant space. The shape of the oil chamber 14 may roughly be considered to resemble that of a central ring-shaped space 19 (Figure 6) having on opposite sides thereof a roof-shaped portion 20 of triangular cross-section separated from the ring-shaped or annular or hollow cylindrical space 19 by lines of demarcation 21. The regularity of the oil chamber 14, however, is interrupted periodically by partitions 22 and 23 extending into the central space 19 from the opposite side walls 24 and 25 of the bearing body 11. The partitions 23, however, do not extend entirely across the oil chamber 14 but only approximately two-thirds of the way across it so that an undulating path remains for the oil to circulate throughout the oil chamber 14, as clearly shown in Figures 5 and 6. The partitions 22 thus form reinforcing pillars extending into the oil chamber 14 from opposite sides thereof.

The process of making the heavy duty powdered metal porous chambered bearing 10 first requires the making of an infiltratable core, generally designated 30 (Figures 2 and 3). If the oil chamber is to be a hollow or empty void, the core 30 is made from an infiltratable metal or metal alloy throughout. By an infiltratable metal or metal alloy is meant such a metal or metal alloy as will, when melted during the sintering operation, penetrate the pores of the powdered metal bearing body 11 in which it is placed. The melting point of the metal or metal alloy of the core 30 should be lower than the melting point of the metal of the bearing body 11, so that sintering takes place at a temperature above the melting point of the former and below the melting point of the latter.

For example, if the bearing body 11 is composed of particles 18 of powdered iron, the core 30 may be made from copper or from a copper zinc alloy. An alloy of 85 parts copper to 15 parts zinc has been found satisfactory for this purpose sintered at approximately 2020° F. If, on the other hand, the bearing body 11 is composed of particles 18 of powdered bronze, the core 30 may be composed of metallic lead, with the optional addition of a small quantity of antimony to raise its melting point. If it is desired to harden the bearing subsequently by suitable heat treatment, carbon may be added to the powdered iron particles.

If, on the other hand, it is desired to make an oil chamber filled with the honeycomb structure 15, the core 30 is made up of a composite of the infiltratable metal or alloy as above set forth, with coarse particles of non-infiltratable metal interspersed throughout the core in closely packed relationship. These particles are preferably of the same metal as the particles 18 forming the bearing body 11, such as, for example, iron or bronze particles. In view of the superiority of the honeycomb oil chamber over the plain, empty or hollow oil chamber, the formation of the honeycomb oil chamber is shown in the drawings.

In either event, the core 30 is formed in a suitable way in the shape shown in Figure 3, such as by casting the infiltratable metal or metal alloy in the approximately knife-edged alternately notched ring form shown in Figures 2 and 3. The core in this form consists of a central approximately cylindrical portion 31 of approximately rectangular cross-section having a roof-shaped portion 32 on opposite sides thereof and of approximately triangular cross-section. The continuity of the core 30 is interrupted at intervals by notches 33 and 34 entering the core 30 from the opposite approximately sharp edges 35 and 36. The notches 33 and 34 extend almost to the lines of demarcation or junction 37 and 38 between the central portion 31 and lateral portions 32, their bottoms 39 and 40 terminating slightly short of the lines 37 and 38 (Figure 3).

The core 30 thus formed, is now embedded in a mass 41 of powdered metal from which the bearing body 11 is to be made, for example, powdered iron or powdered bronze. To do this, a conventional powdered metal molding press, generally designated 42, is employed. Such presses are well known in the powdered metal industry, hence Figure 1 shows only the central portion of such a press including the upper tubular plunger 43 and the lower tubular plunger 44, both entering the die cavity 45 in the die or mold 46 from opposite ends thereof. The tubular plungers 43 and 44 are bored internally as at 47 and 48 to receive a conventional core rod or central plunger 49 having an upper end 50. The upper and lower tubular plungers 43 and 44 are provided with ends 51 and 52 respectively between which the bearing body 11 is formed by compression.

In molding the bearing body, the upper tubular plunger 43 is retracted to a sufficient distance above the upper surface 53 of the die or mold 46 to permit filling the mold cavity 54 with powdered metal. The lower tubular plunger 44 and core rod 49 meanwhile occupy positions in the lower portions of the bores 45 and 48 respectively, the top of the core rod 50 coming to rest approximately on the same level as the upper surface 43 of the die or mold 46. The upper surface 52 of the lower plunger 44, however, is ordinarily located a short distance below the position shown in Figure 1, which shows the position of the parts at the instant of maximum compression of the powdered metal charge 41.

With the plungers 43, 44 and 49 thus located, the operator partially fills the mold cavity 54 lying between the mold bore 45 and the outer surface 55 of the core rod 49 with the powdered metal to be used for the bearing body 11, for example, powdered iron or bronze. He then places the core 30 in the position shown in Figure 1 on top of the powdered metal previously placed in the mold cavity 54, and then fills up the mold cavity with more of the same powdered metal, burying the core 30 in this manner and filling the mold cavity 54 approximately to the top surface 53 of the mold or die 46. The operator then operates the press 42 to cause the ends 51 and 52 of the upper and lower tubular plungers 43 and 44 to approach one another, compressing the powdered metal charge 41 around the core 30. The roof-shaped portions 32 with their approximately sharp edges 35 and 36 deflect the powdered metal particles so that these flow easily and naturally around the core 30 during the compressing operation.

This shape of core thus results in a more uniform density in the compressed charge 21 as compared with the use of a flat-ended hollow cylindrical core. In the use of the latter, the flat ends of the core serve as abutments or barriers which prevent the free flow of the metal particles 18 during the compressing operation, with the result that the density is very high immediately adjacent these flat ends but considerably less at the sides of such a core. The sharp-edged core 30 with its oppositely-tapered ends prevents or at least minimizes this variation in density and produces a superior product.

After the charge 41 containing the core 30 has been compressed to the desired density, the upper tubular plunger 43 is retracted upward and the lower tubular plunger 44 advanced until its upper end 52 reaches the level of the top surface 53 of the die 46, ejecting the compressed charge 41 containing the core 30. This assembly is generally designated 56. The assembly 56 is then placed in a sintering oven and sintered at a suitable temperature, dependent upon the metal used for the bearing body 11 and core 30 respectively. As stated above, for the copper-zinc core of 85 parts copper to 15 parts zinc, a sintering temperature of 2020° F. has been found suitable, a sintering time of approximately one-half hour being suitable for small objects. The time of sintering will necessarily vary according to the size of the object. The temperature of sintering should be higher than the melting point of the core 30 and lower than the melting point of the powdered metal forming the charge 41.

During the sintering operation, the infiltratable metal of the core 30 melts and infiltrates the pores between the metal particles 18 of the bearing body 11, leaving behind it in the oil chamber 14 the honeycomb structure 15 consisting of the coarse non-infiltratable metal particles 16 separated from one another by the minute spaces 17. If the core 30 is made of solid infiltratable metal without the non-infiltratable particles 16, it disappears entirely into the bearing body 11, assuming that the latter is large enough and has sufficient porosity to absorb it, leaving a void of the same shape as the original shape of the core 30. The notches 33 and 34 in the core 30 were, of course, filled with powdered non-filtratable metal during the molding operation, and these portions now form the partitions or reinforcing pillars or columns 22 and 23 extending inwardly into the oil chamber 14 from opposite directions and slightly overlapping one another, as shown in Figure 6. The bearing 10 now has the shape shown in Figures 4, 5 and 6.

To fill the bearing 10 with lubricant, several procedures may be employed. One procedure is to immerse the bearing 10 in a tank of hot oil and boil out the air bubbles, thereby causing the oil to penetrate the pores of the bearing body 11 and fill up the air spaces 17 of the honeycomb structure 15 in the oil chamber 14. Another procedure is to place the bearing in a vacuum tank of oil, evacuating the air from the tank and thereby drawing the air out of the oil well 14. Readmission of the air to the tank causes the atmospheric pressure to force the oil through the pores of the bearing body 11 into the oil chamber 14. Still another procedure of filling the oil well 14 is to place the bearing 10 in the cavity of a press, cover it with lubricant and force a plunger into the cavity on top of the lubricant, forcing the lubricant through the pores into the oil chamber 14.

In any event, the oil chamber 14 is substantially filled with lubricant and the bearing is ready for use in the usual way. During use, the lubricant from the oil chamber 14 seeps through the pores of the bearing body 11 into the bearing bore 12 and lubricates the surface thereof for smooth rotation of the shaft or other machine element which rotates therein. The cellular structure 15 breaks up the body of the lubricant within the oil chamber 14 and consequently prevents the formation of large air bubbles which may impede the flow of lubricant. The partitions 22 and 23 extending inwardly from opposite ends of the bearing enable the bearing to sustain heavy radial loads on its inner and outer side walls 12 and 13 without cracking or breaking.

A powdered bronze porous chambered bearing may be made according to the present invention by forming the core 30 out of lead, either pure metallic lead or an alloy of lead with a small amount of antimony to raise its melting point. The powdered bronze containing the lead core is molded in the same manner described above and thereafter sintered in a sintering oven at a temperature above the melting point of the lead or lead alloy core and below the melting point of the powdered bronze body. In a similar manner, a porous chambered bearing of powdered aluminum or aluminum alloy such as duralumin may be made by using a core of thallium or other metal infiltratable into aluminum and having a lower melting point. The core is embedded in the powdered aluminum, compressed in the manner shown in Figure 1, and thereafter sintered at a temperature above the melting point of the core and below the melting point of the aluminum or aluminum alloy.

What I claim is:

1. A heavy duty porous chambered bearing comprising a body of sintered powdered metal having a bearing surface adapted to be subjected to frictional engagement by another machine element, said body having a lubricant chamber therein, said chamber having walls integral with said body, said walls substantially completely surrounding said chamber, and reinforcement partitions integral with said walls disposed at intervals in said chamber, said partitions constituting struts extending between and interconnecting opposite walls thereof, said partitions also extending partway across said chamber from one side thereof toward the other side thereof.

2. A heavy duty porous chambered bearing comprising a body of sintered powdered metal having a bearing surface adapted to be subjected to frictional engagement by another machine element, said body having a lubricant chamber therein, said chamber having walls integral with said body, said walls substantially completely surrounding said chamber, and reinforcement partitions integral with said walls disposed at intervals in said chamber, said partitions constituting struts extending between and interconnecting opposite walls thereof, certain of said partitions extending partway across said chamber from one side thereof toward the other side thereof, and others of said partitions extending in the opposite direction partway across said chamber from said last-mentioned side toward said first-mentioned side.

3. A heavy duty porous chambered bearing comprising a body of sintered powdered metal having a bearing surface adapted to be subjected to frictional engagement by another machine element, said body having a lubricant chamber therein, said chamber having walls integral with said body, said walls substantially completely surrounding said chamber, and reinforcement partitions integral with said walls disposed at intervals in said chamber, said partitions constituting struts extending between and interconnecting opposite walls thereof, certain of said partitions extending partway across said chamber from one side thereof toward the other side thereof, and others of said partitions extending in the opposite direction partway across said chamber from said last-mentioned side toward said first-mentioned side, said oppositely-directed partitions being disposed in alternating sequence along said chamber with their inner ends disposed in overlapping relationship relatively to one another whereby to provide a chamber of zigzag shape.

4. A heavy duty porous chambered bearing comprising a body of sintered powdered metal having a bearing surface adapted to be subjected to frictional engagement by another machine element, said body having a lubricant chamber therein, said chamber having walls integral with said body, said walls substantially completely surrounding said chamber, and reinforcement partitions integral with said walls disposed at intervals in said chamber, said partitions constituting struts extending between and interconnecting opposite walls thereof said partitions extending toward one another with their inner ends disposed in overlapping relationship relatively to one another in said chamber.

5. A heavy duty porous chambered bearing comprising a body of sintered powdered metal having a bearing surface adapted to be subjected to frictional engagement by another machine element, said body having a lubricant chamber therein, said chamber having walls integral with said body, said walls substantially completely surrounding said chamber, and reinforcement partitions integral with said walls disposed at intervals in said chamber and extending between opposite walls thereof, said chamber having a metallic honeycomb structure of coarser porosity than said walls disposed in and substantially filling said chamber.

6. A heavy duty porous chambered bearing comprising a body of sintered powdered metal having a bearing surface adapted to be subjected to frictional engagement by another machine element, said body having a lubricant chamber therein, said chamber having walls integral with said body, said walls substantially completely surrounding said chamber, and reinforcement partitions integral with said walls disposed at intervals in said chamber and extending between opposite walls thereof, said partitions also extending partway across said chamber from one side thereof toward the other side thereof, said chamber having a metallic honeycomb structure of coarser porosity than said walls disposed in and substantially filling said chamber.

7. A heavy duty porous chambered bearing comprising a body of sintered powdered metal having a bearing surface adapted to be subjected to frictional engagement by another machine element, said body having a lubricant chamber therein, said chamber having walls integral with said body, said walls substantially completely surrounding said chamber, and reinforcement partitions integral with said walls disposed at intervals in said chamber and extending between opposite walls thereof, certain of said partitions extending partway across said chamber from one side thereof toward the other side thereof, and others of said partitions extending in the opposite direction partway across said chamber from said last-mentioned side toward said first-mentioned side, said chamber having a metallic honeycomb structure of coarser porosity than said walls disposed in and substantially filling said chamber.

References Cited in the file of this patent
UNITED STATES PATENTS

| | | |
|---|---|---|
| 2,084,756 | Albrecht | June 22, 1937 |
| 2,628,138 | Blood | Feb. 10, 1953 |